(12) United States Patent
Terrier et al.

(10) Patent No.: US 6,219,613 B1
(45) Date of Patent: Apr. 17, 2001

(54) VEHICLE POSITION DETERMINATION SYSTEM AND METHOD

(75) Inventors: Daniel L. Terrier, Toronto; Robert Walter Tiernay, Oakville, both of (CA)

(73) Assignee: Mark IV Industries Limited, Mississauga (CA)

( * ) Notice: Subject to any disclaimer, the term of this patent is extended or adjusted under 35 U.S.C. 154(b) by 0 days.

(21) Appl. No.: 09/551,278

(22) Filed: Apr. 18, 2000

(51) Int. Cl.[7] .................................................. B01C 21/00
(52) U.S. Cl. .............................. 701/207; 701/24; 342/42; 342/46; 342/51
(58) Field of Search ....................... 701/207, 24; 342/42, 342/46, 70, 445, 447, 448, 449, 456, 51; 340/928, 905, 988, 500, 505, 10.1, 825.65

(56) References Cited

U.S. PATENT DOCUMENTS

| | | |
|---|---|---|
| 5,485,520 * | 1/1996 | Chaum et al. ........................ 380/24 |
| 5,675,342 | 10/1997 | Sharpe . |
| 5,710,556 | 1/1998 | Nishimura et al. . |
| 5,790,052 | 8/1998 | Grabow . |
| 5,805,082 * | 9/1998 | Hassett ................................. 340/928 |

* cited by examiner

Primary Examiner—William A. Cuchlinski, Jr.
Assistant Examiner—Yonel Beaulieu
(74) Attorney, Agent, or Firm—Cummings & Lockwood

(57) ABSTRACT

A vehicle position determination system for determining the position of a moving vehicle having a transponder includes a first and second antennas operable to receive periodic radio frequency data signals from the transponder when the transponder is moving through a first or second predetermined coverage zone, respectively. The first and second coverage zones partially overlap and each have a width that is orthogonal to the travel path of the moving vehicle and a length that is parallel to the travel path of the moving vehicle. A processor counts the number of periodic data signals received by each of the antennas from the transponder during a time period and determines based on the count a probable location of the vehicle. The vehicle location information can be provided to an imaging system to discriminate between transponder and non-transponder equipped vehicles.

20 Claims, 3 Drawing Sheets

VEHICLE POSITION DETERMINATION SYSTEM AND METHOD

BACKGROUND OF THE INVENTION

The present invention is directed towards a vehicle position determination system and method for determining the position of a moving vehicle having a transponder.

In electronic toll systems which monitor adjacent lanes of traffic flow, Automatic Vehicle Identification ("AVI") Radio Frequency ("RF") coverage is often used to provide coverage zones that extend from side-to-side of each lane. RF transponders mounted on the vehicles using the toll system are interrogated by AVI RF antennas that are connected to a roadside AVI reader. In toll systems, the roadside AVI reader is typically connected to a lane controller which is also connected to a vehicle detector and an imaging system which works in association with the AVI RF system to permit the vehicles to be detected, classified, and photographed, and the license plate numbers analyzed in order to permit the operator of the toll system to apply appropriate charges to the owner of the vehicle. In electronic toll systems, it is often necessary to determine in which lateral position a vehicle is traveling. For example, it is often necessary to separate vehicles equipped with transponders from vehicles without transponders and associate video images with vehicles that are not equipped. In order to do so, the electronic toll system must clearly identify where the subject vehicle is located within the multiple zones of coverage.

In previous systems, the location of the transponder and vehicle is subject to uncertainty because the RF capture zones may overlap. In open road applications, the overlap provided is usually extensive by design in order to provide shoulder-to-shoulder coverage of the entire roadway. In such systems, the roadside AVI reader establishes communications with the transponder in any one of several overlapping zones, and accordingly the system cannot ascertain in which lane the subject vehicle is located by using communications as the only location method. One attempt to solve this problem uses separate coverage zones to cover each of the adjacent lanes, with a further trailing coverage zone to cover vehicles that might drive along the center of the road. In such previous systems, the trailing center capture zone could not be placed co-linear with the capture zones for the adjacent lanes as it was necessary to differentiate the transponder data available from the center zone from the other capture zones in order to allow the roadside equipment to differentiate between vehicles correctly positioned within their respective lanes, and vehicles straddling the center line between two lanes. Such a configuration can result in time ambiguity as the data from the trailing coverage zone is received later than the data from the other coverage zones, during which time the co-ordination with the vehicle detector and lane controller is made ambiguous and the vehicle may have changed positions.

Overlapping coverage zones can also be problematic in conventional toll plaza or toll gate systems. In such systems, the lanes are typically separated by physical barriers, and accordingly the overlap between adjacent coverage zones is generally small. Nonetheless, the small amount of overlap that does exist can result in a transponder equipped vehicle being processed in the wrong lane. When a transponder is processed in the wrong lane, the normal high speed processing of AVI transactions is severely disrupted because the patron who is charged incorrectly will not receive an indication to proceed through the lane.

It is therefore desirable to provide a vehicle position determination system and method having improved accuracy for determining the position of a moving vehicle having a transponder in an electronic toll system. It is also desirable to provide such a system in which all the RF coverage zones can be aligned co-linearly across a roadway in order to minimize time ambiguity between the zones.

SUMMARY OF THE INVENTION

According to one aspect of the invention there is provided a vehicle position determination system for determining the position of a moving vehicle having a transponder, comprising a first antenna positioned to receive periodic radio frequency data signals from the transponder when the transponder is moving through a first predetermined coverage zone having a width that is orthogonal to the travel path of the moving vehicle and a length that is parallel to the travel path of the moving vehicle, the length of the first coverage zone varying in a predetermined manner across the width thereof. The system also includes a second antenna positioned to receive periodic radio frequency data signals from the transponder when the transponder is moving through a second predetermined coverage zone that partially overlaps the first coverage zone and has a width that is orthogonal to the travel path of the moving vehicle and a length that is parallel to the travel path of the moving vehicle, the length of the second coverage zone varying in a predetermined manner across the width thereof Processing means responsive to the antennas counts the number of periodic data signals received by each of the antennas from the transponder during a time period and determines based on the count a probable location of the vehicle. Preferably, the processing means causes the first and second antennas to each transmit periodic interrogation signals to the first and second coverage zones, respectively, to cause the transponder to transmit the data signals when the transponder is located in at least one of the coverage zones.

According to a further aspect of the invention, there is provided a vehicle position determination system for determining the position of a moving vehicle having a transponder that transmits data signals in response to interrogation signals, comprising a plurality of antennas positioned to transmit periodic radio frequency interrogation signals to a plurality of coverage zones and receive data signals transmitted by the transponder in response to the interrogation signals when the transponder is located in one or more of the coverage zones, the coverage zones (a) being substantially aligned along an axis that extends orthogonal to the travel path of the moving vehicle with adjacent coverage zones partially overlapping each other, and (b) each having a generally known shape and size and each having a width that is orthogonal to the travel path of the moving vehicle and a length that is parallel to the travel path of the moving vehicle and which varies across the width of the coverage zone. The system also includes processing means operatively connected to the antennas to cause the antennas to transmit the interrogation signals and to count the number of data signals received by the antennas in respect of each of the coverage zones during a time period and determine based on the count a probable location of the vehicle.

According to another aspect of the invention, there is provided a method of determining the position of a moving vehicle having a transponder, comprising the steps of (a) transmitting periodic data signals from the transponder when the transponder is located within one or more of a plurality of coverage zones that are aligned along an axis that extends orthogonal to the travel path of the moving vehicle with adjacent coverage zones partially overlapping each other, the coverage zones each having a known shape and size and each having a width that is orthogonal to the travel path of the moving vehicle and a length that is parallel to the travel path of the moving vehicle and which varies across the width of the coverage zone; (b) counting, for a time period that commences when the transponder first enters one of the coverage zones, the data signals transmitted by the transponder in each of the coverage zones; and (c)determining, based on the counted data signals for each of the coverage zones a probable location of the vehicle.

DETAILED DESCRIPTION OF THE PREFERRED EMBODIMENTS

Figure 1:
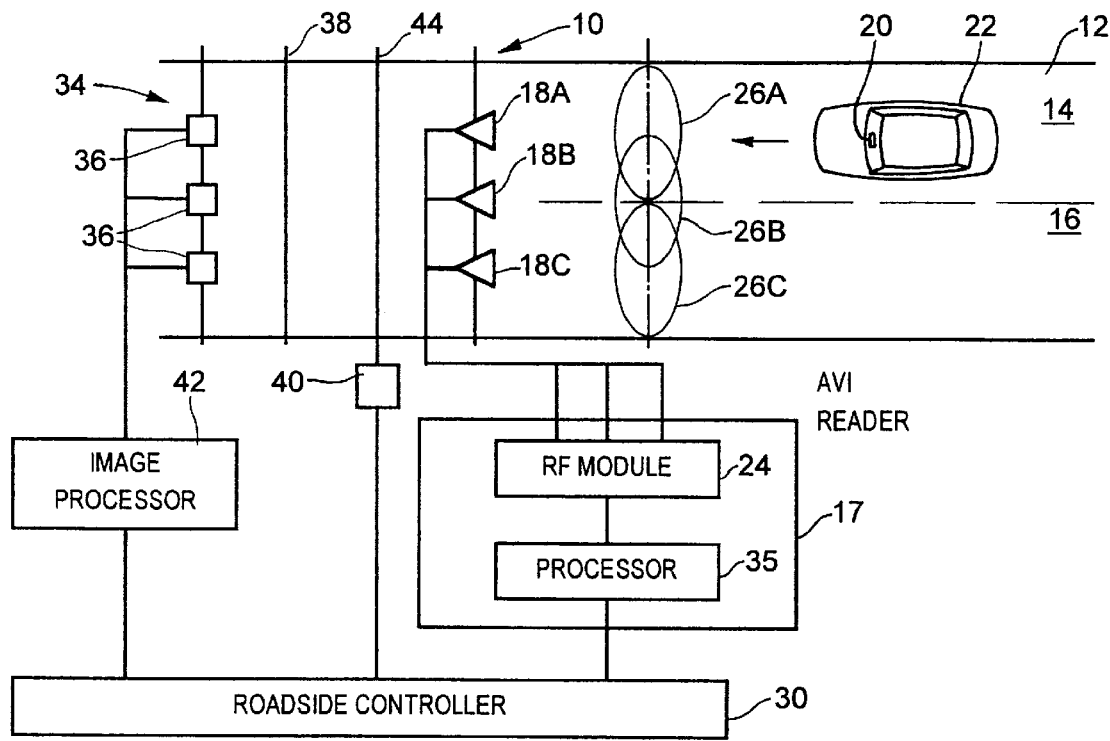
FIG. 1 is a plan view and block diagram of a typical installation of the preferred embodiment of the vehicle position determination system in a two lane open road application.

With reference to FIG. 1, there is shown a preferred embodiment of a vehicle position determination system, illustrated generally by reference numeral 10, of the invention. As shown in FIG. 1, the vehicle position determination system is applied to a roadway 12 having first and second adjacent lanes 14 and 16. The roadway 12 may be a two lane access roadway leading towards or away from a toll highway. The vehicle position determination system 10 includes three antennas 18A, 18B and 18C, each of which is connected to signal processing means, namely an Automatic Vehicle Identification ("AVI") reader 17. The AVI reader 17 processes signals that are sent and received by the antennas 18A, 18B and 18C, and includes a processor 35 and a Radio Frequency (RF) module 24.

The RF module 24 is configured to modulate signals from the processor 35 for transmission as RF signals over the antennas 18A, 18B and 18C, and to de-modulate RF signals received by the antennas 18A, 18B and 18C into a form suitable for use by the processor 35. In this regard, the AVI reader 17 employs hardware and signal processing techniques that are well known in the art. The processor 35 includes a programmable processing unit, volatile and non-volatile memory storing instructions and data necessary for the operation of the processor 35, and communications interfaces to permit the processor 35 to communicate with RF module 24 and a roadside controller 30.

The antennas 18A, 18B and 18C, and AVI reader 17 function to trigger or activate a transponder 20 (shown in the windshield of car 22), to record transponder specific information, and to acknowledge to the transponder 20 that a validated exchange has taken place. The antennas 18A, 18B and 18C are directional transmit and receive antennas which, in the illustrated preferred embodiment, have an orientation such that each antenna 18A, 18B and 18C can only receive signals transmitted from a transponder when the transponder is located within a roughly elliptical coverage zone associated with the antenna. The antennas 18A, 18B and 18C are located above the roadway 12 and arranged such that the antenna 18A has a generally elliptical coverage zone 26A that extends across the first lane 14, antenna 18B has a generally coverage zone which extends from approximately the center of lane 14 to the center of lane 16, and the antenna 18C has a generally elliptical coverage zone 26C which extends across the entire width of the second lane 16. Each of the elliptical coverage zones 26A, 26B and 26C are of an approximately similar elliptical shape and cover an approximately similar sized area. Furthermore, the coverage zones 26A, 26B and 26C are aligned side-by-side along an axis 28 that is orthogonal to the travel path along roadway 12. In the embodiment illustrated, the major axes of the elliptical coverage zones 26A, 26B and 26C are co-linear with each other, and extend orthogonally to the direction of travel. As is apparent from FIG. 1, the coverage zone 26A provides complete coverage of the first lane 14, and the coverage zone 26C provides complete coverage of the second lane 16. The coverage zone 26B overlaps both of the coverage zones 26A and 26C.

It will be understood that although the coverage zones 26A, 26B and 26C are illustrated as having identical, perfect elliptical shapes, in reality the actual shapes of the coverage zones 26A, 26B and 26C will typically not be perfectly elliptical, but will have a shape that is dependent upon a number of factors, including RF reflections or interference caused by nearby structures, the antenna pattern and mounting orientation. Prior to operation of the vehicle position determination system 10, the actual approximate coverage shape and size of each of the coverage zones are determined through well known mapping or approximation techniques, and stored by the processor 35 of the vehicle position determination system 10 such that the size, shape and location of each of the coverage areas 26A, 26B and 26C are generally known and predetermined by the system.

The AVI reader 17 is connected to a roadside controller 30. In open road toll systems, the vehicle position determination system 10 will often be used in conjunction with a vehicle imaging system, which is indicated generally by reference numeral 34. The imaging system 34 includes an image processor 42 to which is connected a number of cameras 36 arranged to cover the width of the roadway for capturing images of vehicles as they cross a camera line 38 that extends orthogonally across the roadway 12. The image processor 42 is connected to roadside controller 30, and operation of the cameras 36 is synchronized by the roadside controller 30 in conjunction with a vehicle detector 40. The vehicle detector 40, which is connected to the roadside controller 30, detects when a vehicle has crossed a vehicle detection line 44 that extends orthogonally across the roadway 12, which is located before the camera line 38 (relative to the direction of travel). The output of the vehicle detector 40 is used by the roadside controller 30 to control the operation of the cameras 36. The vehicle detector 40 can take a number of different configurations that are well known in the art, for example it can be a device which detects the obstruction of light by an object.

Figure 3:
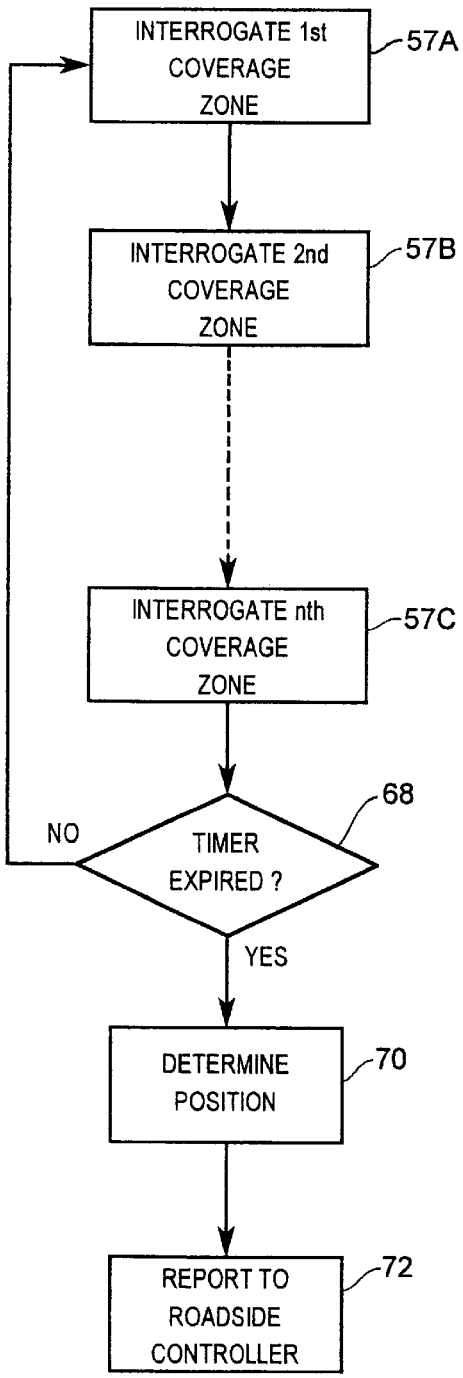
FIG. 3 is a flow chart showing the operation of a preferred embodiment of the vehicle position determination system.

With reference to FIG. 1 and the flow charts of FIGS. 3 and 4, the operation of a vehicle position determination system of the present invention will now be described. The AVI reader 17 is configured to repeatedly perform periodic interrogation cycles. In particular, with reference to FIG. 3, the AVI reader 17 is programmed so that during each interrogation cycle all of the first to "nth" coverage zones of the vehicle position detection system are sequentially interrogated in time division multiplex manner (steps 57A, 57B to 57C). In the case of the vehicle position detection system 10 shown in FIG. 1, only three coverage zones 26A, 26B and 26C need be interrogated, and accordingly for such system, n=3.

Figure 4:
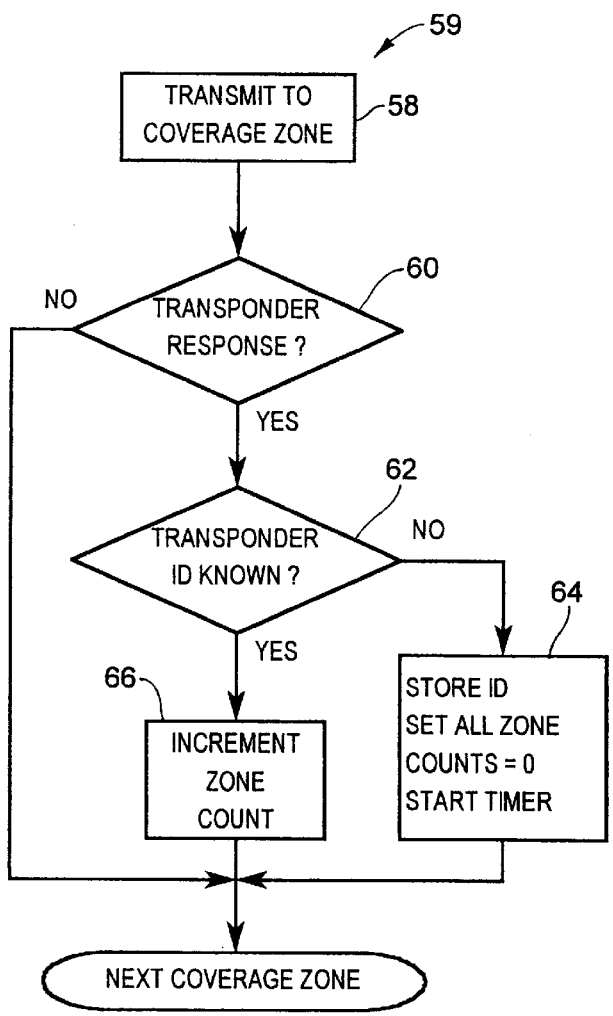
FIG. 4 is a flow chart of an interrogation of a coverage zone.

FIG. 4 is a flow chart of a coverage zone interrogation routine 59 that is performed as part of each of the coverage zone interrogation steps 57A, 57B to 57C. When interrogating a coverage zone, the AVI reader 17 causes the antenna associated with the coverage zone to transmit an interrogation signal to the coverage zone (step 58), and then checks to see if a response data signal is received by the associated antenna from a transponder (step 60). Thus, in the case of the first coverage zone, the AVI system 17 causes antenna 18A to transmit an interrogation signal to coverage zone 26A, and checks to see if antenna 18A subsequently receives a response signal transmitted by a transponder.

If no transponder is located within the interrogated coverage zone then no transponder response will be received by the antenna associated with that coverage zone and the interrogation routine 59 will end in respect of that coverage zone and commence in respect of the next coverage zone. If, however, any transponders are located in the interrogated coverage zone, they will each respond to the interrogation signal with a response data signal, which includes a unique transponder ID code for each transponder. The AVI processor 35 then determines, for each transponder that responded, if the transponder ID code is known (step 62).

An unknown transponder ID code signifies that a previously untracked transponder has entered the coverage zones. For each previously unknown transponder, a tracking initialization step 64 is performed in which the transponder ID code is stored by AVI reader 17 (thereby making the transponder ID a known ID during subsequent interrogations). For each transponder it tracks, the AVI reader 17 maintains a zone counter for each of the coverage zones to count the number of responses received from the transponder in each of the separate coverage zones during a sampling time period. Accordingly, as part of the tracking initialization step 64, the AVI reader sets all the zone counters for the transponder to zero, and starts a transponder specific timer to count down a sampling time period for the transponder.

A known transponder ID signifies that the transponder is already being tracked by the AVI reader 17 (ie. that transponder has already sent a data response signal to at least one of the system antennas 18A, 18B or 18C). For each transponder which responds with a known ID, the zone counter associated with the transponder for the coverage zone is incremented (step 66).

As noted above, the interrogation routine 59 is performed for each of the first to nth coverage zones during each interrogation cycle. At the end of each interrogation cycle, the AVI processor 35 checks to see if the timers for any of the transponders that are currently being tracked have expired (step 68). For any transponders for which the corresponding timers have expired (i.e. the sampling time period has run out), the AVI processor determines, based on the coverage zone counts for each transponder, a probable lateral position on the roadway of the vehicle carrying the transponder (step 70), and communicates a report to the roadside controller 30 (step 77).

Thus, each time a transponder enters one of the three coverage zones 26A, 26B or 26C, the AVI reader 17 establishes communication with the transponder 20 and counts the number of transponder response data signals received by each of the antennas 18A, 18B and 18C from the coverage zones 26A, 26B and 26C, respectively, during the sampling time period. By comparing the total counts for each coverage zone, a probable vehicle position can be determined. The system 10 is able to track multiple transponders simultaneously through the coverage zones as it counts down a sampling time period and tracks zone counts for each unique transponder ID.

In one preferred embodiment, the sampling time period is of a predetermined duration that is generally sufficient to allow an adequate number of interrogation cycles to occur for the AVI reader 17 to determine, with acceptable accuracy, the location of transponder and vehicle 22. The predetermined time period is application specific (depending on many factors, for example how quick the positional data is needed by down road equipment such as imaging system 34, and the maximum speed of vehicles on the roadway). Preferably, the sampling time period should be set such that in the majority of cases, the vehicle will have at least passed axis 28 when the time period expires.

In another possible embodiment of the invention, the sampling time period can be set to vary according to the speed of the particular vehicle being tracked. For example, the AVI reader 17 could be configured to end the sampling time in the event that none of the antennas 18A, 18B or 18C receives a data response signal from a transponder during one (or more) interrogation cycles (the absence of a response indicating the vehicle has already passed through the coverage zone).

As noted above, the AVI reader 17 determines probable vehicle location by comparing the number of periodic response signals received from a specific transponder for each antenna 18A, 18B and 18C during the sampling time period. The total count information can be processed to provide different levels of locational resolution. For example, in the case of similar elliptical coverage zones 26A, 26B and 26C, the AVI reader can be configured to classify the transponder as being: (1) in lane 14 if the total count is highest for antenna 18A; (2) in lane 16 if the total count is highest for antenna 18C; or (3) in the center of roadway 12, if the count from the antenna 18B is the highest. In the event of a tie, the AVI reader can be configured to arbitrarily choose one of the two possible positions.

Figure 5:
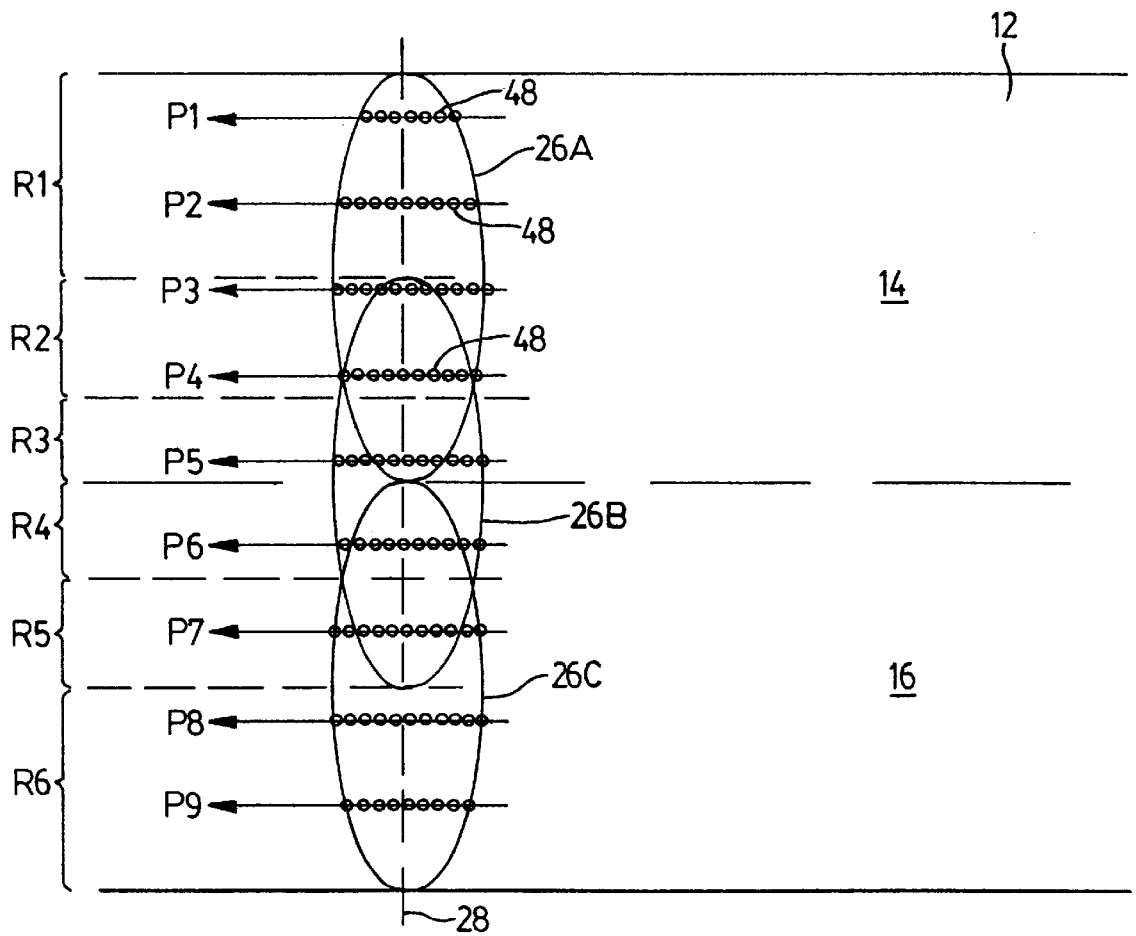
FIG. 5 is a partial plan view showing exemplary transponder paths through the coverage zones of the vehicle position determination system of FIG. 1.

Interpolation analysis, involving comparing the ratios of total counts from the different coverage areas to predetermined thresholds, could be used to provide a higher level of resolution. For example, as shown in FIG. 5, the roadway 12 can be divided into ranges R1–R6 across its width, with position being determined according to the following exemplary interpolation algorithm:

IF COUNT A>0 AND COUNT B=0 THEN LOCATION= R1 ELSE . . .

IF COUNT A>0 AND COUNT A/COUNT B>1 THEN LOCATION=R2 ELSE

IF COUNT A>0 AND COUNT A/COUNT B$\leq$1 THEN LOCATION=R3 ELSE

IF COUNT A=0 AND COUNT B>0 AND COUNT C=0 THEN LOCATION=R3 ELSE

IF COUNT B>0 AND COUNT B/COUNT C$\geq$1 THEN LOCATION=R4 ELSE

IF COUNT B>0 AND COUNT B/COUNT C<1 THEN LOCATION=RS ELSE

LOCATION=R6

Where:

COUNT A, COUNT B and COUNT C are the total number of successful communications for the antennas 18A, 18B and 18C, respectively, during the sampling time period.

As will be noted from the above algorithm, the AVI reader 17 is configured to arbitrarily select a suitable position when the transponder path follows directly along a line where two ranges meet (for example, following the juncture line between range R2 and R3 will result in a location determination of R3 in accordance with the above algorithm).

During the sampling time period, information will preferably be exchanged between the transponder 20 and the determination 10 system. As noted above, the data signal sent out by transponder 20 will include a unique transponder identification code so that the AVI reader 17 can associate the positional data that it generates with a specific transponder identity. Furthermore, at some time during the sampling time, the AVI reader 17 will preferably cause one of the antennas to send a "write" signal to the transponder to provide the transponder with whatever data is required by the toll system. Thus, it will be appreciated that the informational content of the interrogation signals and data signals can vary during the sample time period, however the actual content of such signals does not affect the response data signal count logs kept by the determination system 10.

Once the AVI reader 17 has made a determination of the probable vehicle position, it creates an electronic report that includes the probable position, transponder identification data, and any other information specific to the AVI system, and provides the electronic report to the roadside controller 30. It also erases the transponder ID from its list of "known" transponder IDs as it is no longer tracking the transponder.

The electronic reports that are generated by the vehicle position determination system 10 can be used by the vehicle imaging system 34 to provide improved accuracy in determining between transponder equipped and unequipped vehicles. The presence or absence of an electronic report, together with reliable location information, can be used to qualify the operation of the imaging system 34 so that unnecessary images can be eliminated altogether, or to improve the accuracy of processing images that are taken.

It will be appreciated that in order to provide optimum accuracy for a toll collection system such as that shown in FIG. 1, it is desirable to align the generation of an electronic report for a vehicle with the detection of the vehicle by detector 40 as closely as possible in order to avoid intermediate changes in the vehicle position. Thus coverage zones 26A, 26B and 26C are preferably located as close as possible to detection line 44 as the system constraints allow. The fact that the coverage zones 26A, 26B and 26C are aligned co-linearly across the roadway allows a shorter total sampling period than if they were offset (relative to the direction of traffic) thereby increasing accuracy.

For the purpose of further explaining the invention an exemplary implementation of the vehicle detection system 10 and sample position determinations will now be described. In the exemplary implementation of vehicle detection system 10 in an open road system, each interrogation cycle has a duration of 10 mSec., and the sample time period can be set to 150 mSec, during which time a vehicle will typically traverse about 13 feet at 60 mph. Such a configuration allows the AVI reader 17 to count the number of successful responses for 15 interrogation signals sent out by each of the antennas 18A, 18B and 18C, and determine a probable vehicle location based on such counts. In an exemplary implementation, the vehicle detection line 44 is located further down road than the maximum vehicle travel during the 150 mSecs. For a roadway 12 having typical 14 foot lanes, the coverage zones 26A, 26B and 26C can each have an approximate width across their major axis of 14 feet, and an approximate length across their minor axis (i.e. in the direction of travel) of six feet.

FIG. 5 illustrates a number of possible transponder paths P1–P9 through the coverage zones 26A, 26B and 26C of the exemplary implementation. Each of the circles 48 that are superimposed on the path lines P1–P9 represent response data signals sent from the transponder 20. In particular, each circle that is exclusive to a single coverage zone indicates a response data signal received by the antenna associated with such coverage zone, and each circle in an area where two coverage zones overlap indicates response data signals received by both of the antennas that cover the overlapped area. Table 1 shows, for each of the illustrated transponder paths P1–P9, the resulting total response data signals received by each antenna 18A, 18B and 18C, a vehicle position determination using an average majority (i.e. highest total) method, and a vehicle position determination (ranges R1–R6) using the exemplary interpolation algorithm set out above.

TABLE 1

Exemplary Interrogation Results

| | Interrogation Counts | | | Averaged | Averaged |
| Path | 18A | 18B | 18C | Majority | Interpolation |
| --- | --- | --- | --- | --- | --- |
| P1 | 7 | 0 | 0 | Lane 14 | R1 |
| P2 | 10 | 0 | 0 | Lane 14 | R1 |
| P3 | 11 | 3 | 0 | Lane 14 | R2 |
| P4 | 10 | 9 | 0 | Lane 14 | R2 |
| P5 | 5 | 11 | 0 | Centre | R3 |
| P6 | 0 | 10 | 8 | Centre | R3 |
| P7 | 0 | 7 | 11 | Lane 16 | R4 |
| P8 | 0 | 0 | 11 | Lane 16 | R5 |
| P9 | 0 | 0 | 9 | Lane 16 | R5 |

It will be appreciated that the vehicle position detection system of the present invention could take many different configurations depending upon its particular application. For example, more than three overlapping coverage zones could be used, particularly where it was desirable to cover more than two lanes of a roadway. Furthermore, in situations where lane changes are not permitted due to barriers between traffic lanes, two overlapping coverage zones would be sufficient for two travel lanes.

Figure 2:
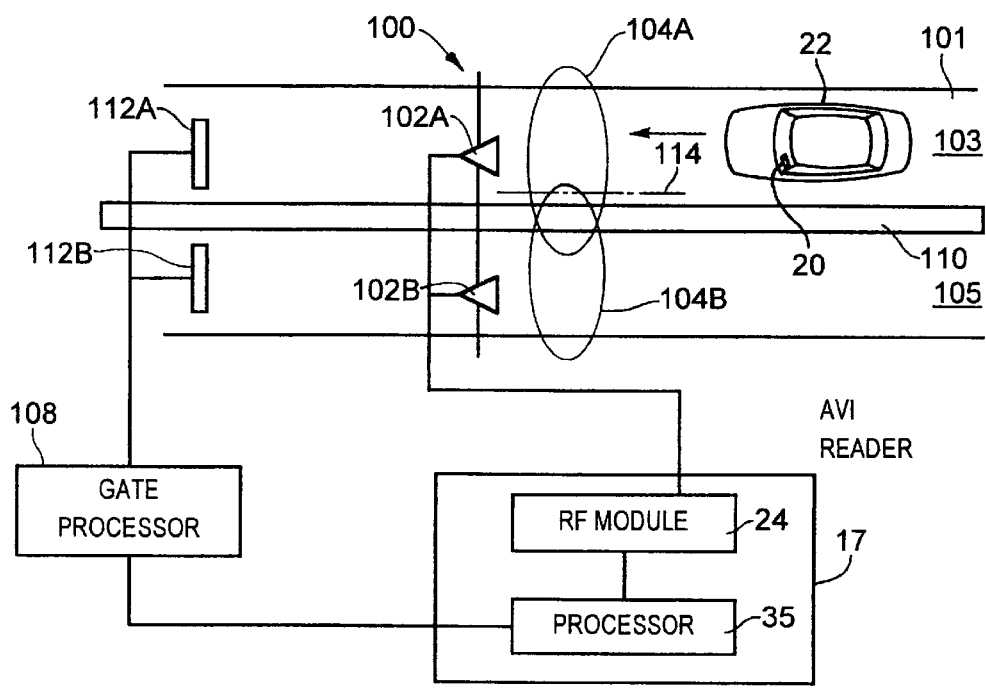
FIG. 2 is a plan view and block diagram of a preferred embodiment of the vehicle position determination system in a separated lane, closed toll system.

In this regard, FIG. 2 illustrates a further preferred embodiment of a vehicle position detection system 100 in accordance with the present invention. The vehicle position detection system 100 is the same as vehicle position detection system 10 described above except as noted below. Detection system 100 is used in a closed lane toll system wherein two adjacent exit lanes 103, 105 of roadway 101 are separated by a physical barrier 110. The presence of physical barrier 110 ensures that vehicles will not straddle the centre line between lanes 103 and 105, and accordingly only two coverage zones 104A and 104B, covered by antennas 102A and 102B, respectively, are required to provide shoulder to shoulder coverage. The antennas 102A and 102B are each connected to AVI reader 17, which determines which of lanes 103 or 105 transponder equipped vehicle 22 is in by determining which of the antennas 102A or 102B has the highest number of successful communications with the vehicle transponder 20 during the sampling period. For example, as shown in FIG. 2, the transponder 20 follows a path indicated by line 114, through both coverage zones 104A and 104B. The AVI reader 17 will conclude that the vehicle 22 is located in lane 103 as the total number of successful communications for antenna 102A will be greater than that for antenna 102B. The AVI reader 17 provides an electronic position report to a gate processor 108 which selectively raises physical barrier 12A or 112B depending upon the position determined by AVI reader 17.

The "averaged majority" and "averaged interpolation" algorithms suggested above are suitable for determining position when the coverage zones each have a generally uniform size and shape. The actual algorithm or method used to determine a position will depend upon a number of factors including the specific application of the vehicle position detection system, the shape and relative sizes of the coverage zones, and the degree of resolution needed for such application. For irregularly shaped coverage zones, the various different permutations and combinations of possible coverage zone counts, or ratios of coverage zone counts, for different possible vehicle paths through the coverage zones can be predetermined and provided to the processor 35 as a locally stored look-up table. As part of the position determination step 70, the processor 35 can compare the coverage zone counts, or ratios of coverage zone counts, as the case may be, to the look-up table to determine a vehicle position.

Although each of the antennas discussed above have been described as both transmitting and receiving, it is also possible that a single transmitting antenna could be used to transmit signals to all coverage zones, with each coverage zone being covered by a separate receive antenna.

As suggested above, although elliptical coverage areas are disclosed as a preferred embodiment, other shapes could also be used for the coverage areas, so long as each coverage area had an known size and shape and the length of each coverage area varied in a known manner along the width of the coverage area, at least at the places where the coverage zones overlapped.

As will be apparent to those skilled in the art in the light of the foregoing disclosure, many alterations and modifications are possible in the practice of this invention without departing from the spirit or scope thereof. The foregoing description is of the preferred embodiments and is by way of example only, and is not to limit the scope of the invention.

We claim:

1. A vehicle position determination system for determining the position of a moving vehicle having a transponder, comprising:
    a first antenna positioned to receive periodic radio frequency data signals from the transponder when the transponder is moving through a first predetermined coverage zone having a width that is orthogonal to the travel path of the moving vehicle and a length that is parallel to the travel path of the moving vehicle, the length of the first coverage zone varying in a predetermined manner across the width thereof;
    a second antenna positioned to receive periodic radio frequency data signals from the transponder when the transponder is moving through a second predetermined coverage zone that partially overlaps the first coverage zone and has a width that is orthogonal to the travel path of the moving vehicle and a length that is parallel to the travel path of the moving vehicle, the length of the second coverage zone varying in a predetermined manner across the width thereof; and
    processing means responsive to the antennas to count the number of periodic data signals received by each of the antennas from the transponder during a time period and determine based on the count a probable location of the vehicle.

2. The vehicle position determination system of claim 1 wherein processing means causes the first and second antennas to each transmit periodic interrogation signals to the first and second coverage zones, respectively, to cause the transponder to transmit the data signals when the transponder is located in at least one of the coverage zones.

3. The vehicle position determination system of claim 2 wherein the first and second coverage zones are substantially aligned side by side along an axis that is orthogonal to the direction of travel.

4. The vehicle position determination system of claim 3 wherein the first and second coverage zones each have approximately similar elliptical shapes with the major axes thereof being substantially linearly co-aligned and extending in a direction orthogonal to the travel path of the vehicle.

5. The vehicle position determination system of claim 2 wherein the first and second coverage zones are of approximately the same size and shape.

6. The vehicle position determination system of claim 5 wherein the processing means is configured to determine a probable location of the vehicle based on which of the antennas receives the greatest number of data signals during the time period.

7. The vehicle position determination system of claim 1 including at least one antenna that is connected to the processing means and operable to transmit interrogation signals to the coverage areas to cause the transponder to transmit the periodic data signals.

8. The vehicle position determination system of claim 1 wherein the processing means is configured to determine a probable location of the vehicle when more than one antenna receives data signals by comparing the ratio of data signals received by the antennas during the time period to predetermined values that are associated with different possible transponder locations.

9. The vehicle position determination system of claim 1 wherein the time period is of a predetermined duration and the processing means is configured to commence the time period when at least one of the antennas first receives a data signal from the transponder.

10. The vehicle position determination system of claim 9 wherein the time period is of variable duration and the processing means is configured to commence the time period when at least one of the antennas first receives a data signal from the transponder and terminate the time period when none of the antennas have received a data signal for a predetermined duration.

11. The vehicle position determination system of claim 1 including a third antenna to receive positioned periodic radio frequency data signals from the transponder when the transponder is moving through a third predetermined coverage zone having a width that is orthogonal to the travel path of the moving vehicle and a length that is parallel to the travel path of the moving vehicle, said third coverage zone having a known size and shape being aligned with the first and second coverage zones along an axis that is orthogonal to the direction of travel, said third coverage zone partially overlapping at least one of said first and second coverage zones.

12. The vehicle position determination system of claim 11 wherein the first coverage zone extends across a first lane of a roadway, the third coverage zone extends across a second lane of a roadway, and the second coverage zone extends partially across both the first lane and the second lane.

13. The vehicle position determination system of claim 11 wherein the processing means is configured to determine the probable location of the vehicle by determining which antenna has the highest count of data signals received from the transponder during the time period, the processing means designating (a) the first lane as the probable vehicle location when the first antenna has the highest count; (b) the second lane as the probable vehicle location when the third antenna has the highest count; and (c) a center of the roadway as the probable vehicle location when the second antenna has the highest count.

14. The vehicle position determination system of claim 1 wherein the first coverage zone extends across a first vehicle lane and partially into a second vehicle lane adjacent and parallel to the first lane, and the second coverage zone extends across the second lane and partially into the first lane, the processing means being configured to determine the probable location of the vehicle by determining which antenna has the highest count of data signals received from the transponder during the time period, the processor designating (a) the first lane as the probable vehicle location when the first antenna has the highest count and (b) the second lane as the probable vehicle location when the second antenna has the highest count.

15. A vehicle position determination system for determining the position of a moving vehicle having a transponder that transmits data signals in response to interrogation signals, comprising:

a plurality of antennas positioned to transmit periodic radio frequency interrogation signals to a plurality of coverage zones and receive data signals transmitted by the transponder in response to the interrogation signals when the transponder is located in one or more of the coverage zones, the coverage zones (a) being substantially aligned along an axis that extends orthogonal to the. travel path of the moving vehicle with adjacent coverage zones partially overlapping each other, and (b) each having a generally known shape and size and each having a width that is orthogonal to the travel path of the moving vehicle and a length that is parallel to the travel path of the moving vehicle and which varies across the width of the coverage zone; and processing means operatively connected to the antennas to cause the antennas to transmit the interrogation signals and to count the number of data signals received by the antennas in respect of each of the coverage zones during a time period and determine based on the count a probable location of the vehicle.

16. A vehicle position determination system according to claim 15 wherein a separate antenna is associated with each of the coverage areas.

17. A vehicle position determination system according to claim 16 wherein the operation of the antennas is time division multiplexed such that each antenna transmits periodic interrogation signals to its associated coverage zone in unique time slots.

18. A method of determining the position of a moving vehicle having a transponder, comprising the steps of:

transmitting periodic data signals from the transponder when the transponder is located within one or more of a plurality of coverage zones that are aligned along an axis that extends orthogonal to the travel path of the moving vehicle with adjacent coverage zones partially overlapping each other, the coverage zones each having a known shape and size and each having a width that is orthogonal to the travel path of the moving vehicle and a length that is parallel to the travel path of the moving vehicle and which varies across the width of the coverage zone;

counting, for a time period that commences when the transponder first enters one of the coverage zones, the data signals transmitted by the transponder in each of the coverage zones; and determining, based on the counted data signals for each of the coverage zones a probable location of the vehicle.

19. The method of claim 18 including the step of transmitting periodic interrogation signals to the coverage zones to cause the transponder to transmit the periodic data signals.

20. The method of claim 19 wherein the coverage zones each have approximately the same size and shape.

* * * * *